United States Patent
Chevrier et al.

(10) Patent No.: US 10,345,009 B2
(45) Date of Patent: Jul. 9, 2019

(54) PANEL AND ASSOCIATED ATTACHMENT DEVICES

(71) Applicant: A. RAYMOND ET CIE, Grenoble (FR)

(72) Inventors: Jean-Baptiste Chevrier, Saint Vincent de Mercuze (FR); Antoine Legall, Fontaine (FR); Richard Petri, Voiron (FR); Emmanuel Turlot, Grenoble (FR)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 15/578,626

(22) PCT Filed: Jun. 1, 2016

(86) PCT No.: PCT/FR2016/051302
§ 371 (c)(1),
(2) Date: Nov. 30, 2017

(87) PCT Pub. No.: WO2016/193614
PCT Pub. Date: Dec. 8, 2016

(65) Prior Publication Data
US 2018/0156496 A1   Jun. 7, 2018

(30) Foreign Application Priority Data
Jun. 1, 2015   (FR) ...................... 15 54926

(51) Int. Cl.
*F24S 30/00*    (2018.01)
*F24S 40/80*    (2018.01)
(Continued)

(52) U.S. Cl.
CPC ............. *F24S 40/80* (2018.05); *F24S 25/632* (2018.05); *F24S 25/634* (2018.05);
(Continued)

(58) Field of Classification Search
CPC ......... F24S 40/80; F24S 25/634; F24S 25/632
(Continued)

(56) References Cited

U.S. PATENT DOCUMENTS 4,184,297 A    1/1980  Casamayor
8,522,490 B1   9/2013  Stancel
(Continued)

FOREIGN PATENT DOCUMENTS

CN    103187464 A    7/2013
EP       130123 A2   1/1985
(Continued)

OTHER PUBLICATIONS

Merriam-Webster on-line dictionary (https://www.merriam-webster.com/dictionary/tongue, downloaded Sep. 25, 2018). (Year: 2018).*
(Continued)

*Primary Examiner* — Jayne L Mershon
(74) *Attorney, Agent, or Firm* — TraskBritt (57) ABSTRACT

The present disclosure concerns a panel capable of bending under the effect of a load and having a peripheral surface provided with a plurality of pivoting attachment devices; each attachment device comprises: a metal gripping member adhered to the peripheral surface of the panel; and a metal clip cooperating by interlocking with the gripping member and configured to allow the gripping member to pivot when the panel bends.

23 Claims, 7 Drawing Sheets

(51) Int. Cl.
*F24S 25/632* (2018.01)
*F24S 25/634* (2018.01)
*F24S 80/00* (2018.01)
*F24S 25/60* (2018.01)

(52) U.S. Cl.
CPC ...... *F24S 2025/601* (2018.05); *F24S 2080/09* (2018.05); *Y02B 10/12* (2013.01); *Y02E 10/47* (2013.01)

(58) Field of Classification Search
USPC .......................................................... 136/244
See application file for complete search history.

(56) References Cited

U.S. PATENT DOCUMENTS

| | | | |
|---|---|---|---|
| 8,720,131 B2 | 5/2014 | Urban et al. | |
| 2010/0059641 A1 | 3/2010 | Twesme et al. | |
| 2012/0090176 A1* | 4/2012 | Stancel | H02S 20/00 29/890.033 |
| 2013/0000689 A1* | 1/2013 | Balyon | F24S 25/33 136/244 |
| 2013/0287518 A1* | 10/2013 | Scroggie | F16B 5/065 411/78 |
| 2014/0053891 A1* | 2/2014 | West | H02S 20/00 136/251 |
| 2015/0135487 A1* | 5/2015 | Steltz | F16B 5/0657 24/593.1 |
| 2015/0274220 A1* | 10/2015 | Telnack | B62D 35/001 296/180.4 |
| 2015/0277496 A1* | 10/2015 | Reeves | G06F 1/1641 345/1.2 |
| 2015/0308183 A1* | 10/2015 | Konstantin | E04D 3/28 52/204.6 |
| 2015/0357967 A1* | 12/2015 | Brennan | H02S 30/10 136/251 |
| 2016/0076294 A1* | 3/2016 | Alexander | E05F 5/022 16/86 R |
| 2016/0117960 A1* | 4/2016 | Dalton | G09F 7/22 248/595 |
| 2016/0141437 A1* | 5/2016 | Asbeck | H01L 31/056 136/246 |
| 2016/0252150 A1* | 9/2016 | Camarasa | F16F 3/12 267/141.1 |

FOREIGN PATENT DOCUMENTS

| | | |
|---|---|---|
| EP | 2562823 A2 | 7/2014 |
| WO | 2012055547 A2 | 5/2012 |

OTHER PUBLICATIONS

International Search Report for International Application No. PCT/FR2016/051302 dated Sep. 16, 2016, 4 pages.
International Written Opinion for International Application No. PCT/FR2016/051302 dated Sep. 16, 2016, 7 Pages.

* cited by examiner

PANEL AND ASSOCIATED ATTACHMENT DEVICES

CROSS-REFERENCE TO RELATED APPLICATION

This application is a national phase entry under 35 U.S.C. § 371 of International Patent Application PCT/FR2016/051302, filed Jun. 1, 2016, designating the United States of America and published as International Patent Publication WO 2016/193614 A1 on Dec. 8, 2016, which claims the benefit under Article 8 of the Patent Cooperation Treaty to French Patent Application Serial No. 1554926, filed Jun. 1, 2015, for "Panel and Associated Attachment Devices," the contents of each of which are incorporated herein in their entirety by this reference.

TECHNICAL FIELD

This disclosure relates to the field of large panels and associated attachment devices. It relates in particular to devices for attaching solar modules, in particular frameless dual-face solar modules.

Currently, more than 90% of photovoltaic (PV) modules comprise a metal frame made from aluminium for stiffening the modules manufactured from an assembly of a glass plate on the front face (exposed to the sun) and a plastic sheet (Tedlar) on the rear face. This configuration enables the module to withstand high stresses, exerted for example, by snow or wind. Another advantage of such a metal frame is facilitating the mechanical attachment of the PV module to a carrier structure (metal or roof).

The mechanical rigidity afforded by the frame enables this construction to pass the certification tests required by current standards, which comprise in particular a test under severe weight load (5400 pascals, i.e., 860 kilograms, on a 250 watt module), which corresponds to a height of snow of more than 5 meters. Under such a load, the glass wall of a framed module measuring 1×1.6 m² flexes at the center by more than 100 mm.

Though this framed module structure has been widely adopted, it does nevertheless have drawbacks. In particular, an extra cost of more than 10% is imposed by the presence of the metal frame.

However, the PV industry is concentrating its development efforts in reducing the cost of the production of electricity while improving the reliability of its installations.

The manufacturers of PV modules have thus become interested in constructing frameless dual-glass and/or dual-face modules in order:

to reduce the manufacturing cost of the module by eliminating the frame; modules based on such an assembly of a glass plate on the front face and a glass plate on the rear face are the most suited to a frameless configuration because of their rigidity;

to increase the electrical power of the module without increasing its surface area by means of the use of dual-face cells.

Two types of lateral attachments for frameless photovoltaic modules are found in the prior art.

The first uses a set of screwed flanges, or resilient flanges, with the interposition of a plastics material between the flange and the module. For example, the document US 2013/0000689 discloses an apparatus suitable for supporting and attaching a frameless module. It uses U-shaped attachment elements comprising a metal part and an elastomer part in contact with the module. The U.S. Pat. No. 8,522,490 for its part proposes an attachment element allowing a degree of rotational freedom of the module, in particular when the latter flexes; this increases the resistance of the module to the forces resulting from a high weight load, by preventing the concentration of stresses present at the edges of the rigid attachments.

The main drawback of this type of attachment nevertheless remains the degradation that the elastomer parts of the attachment elements suffer, in particular because of the severe climatic conditions to which the modules are exposed and because of the mechanical stresses suffered during the flexing of the modules. The reliability of holding of the modules is degraded thereby: when there is a high force, resulting from a high weight load, the edges of the modules risk being extracted from the attachment, thus causing damage to the PV module. This is particularly the case when the elastomer parts are degraded over time.

The second type of attachment is based on the bonding of attachment elements directly to the glass. For example, the U.S. Pat. No. 8,720,131 discloses a system for assembling PV modules comprising two elements intended to cooperate with each other in order to attach the module; one of the elements being bonded to the rear face of the PV module, the other element being secured to rails on the carrier structure. The two elements are able to fit one in the other to allow attachment of the module. The major drawback of this type of attachment lies in the shadow caused at the rear face of the module, which is detrimental to the performance of a dual-face module.

BACKGROUND

One subject matter of this disclosure is therefore proposing an attachment system avoiding the drawbacks of the prior art. One subject matter of this disclosure is in particular a system for attaching a panel that is reliable, simple to manufacture and use and compatible with dual-face panels.

BRIEF SUMMARY

This disclosure relates to a panel able to flex under the effect of a load and having a peripheral surface provided with a plurality of pivoting attachment devices; each attachment device comprises:
 a metal lug bonded to the peripheral surface of the panel;
 a metal clip cooperating by fitting together with the lug and configured so as to allow the pivoting of the lug when the panel flexes. The panel according to this disclosure is provided with reliable metal attachment devices, not liable to degrade over time. The system for attachment by clip procures a high level of mechanical strength and is simple to implement. The connection between the lug and the clip allowing a pivoting movement of one with respect to the other, the resistance of the module to the forces resulting from a high weight load is increased: this is because, when the panel flexes, the lug bonded to it is able to pivot vis-à-vis the clip, which limits a concentration of stresses appearing typically at the edges of rigid attachments.

Moreover, the attachment devices are placed on the peripheral surface of the panel, which makes it compatible with panels functionalized on both faces.

According to advantageous features of this disclosure, taken alone or in combination:
 the lug and the clip are held with respect to each other by claw effect;

the clip comprises two facing walls defining a fitting-together space making it possible to introduce the lug into the clip on a fitting-together axis;

the lug comprises two facing walls defining a fitting-together space making it possible to introduce the clip along a fitting-together axis;

the fitting-together space is sufficient to leave a free space between the lug and the clip, allowing pivoting of one with respect to another when the panel flexes;

each attachment device is configured so as to allow a limited translation movement of the lug along the coupling axis when the panel flexes;

the panel has two main faces and an edge connecting the two main faces, and the peripheral surface extends over a peripheral part of each of the main faces and over the edge;

each attachment device comprises a stop blocking the translation movement of the lug, in a direction perpendicular to the coupling axis and parallel to the main faces of the panel;

the lug comprises a first part bonded to one of the main faces;

the lug comprises a second part bonded to the other one of the main faces;

the lug comprises a third part bonded to the edge, forming with the first and second parts a U-shaped bracket;

the lug comprises an offset part having two opposite free faces to which the clip is attached;

the attachment device comprises a linear support body helping to allow the pivoting of the lug when the panel flexes.

The attachment device according to this disclosure allows a pivoting movement between the lug and the clip, as well as a limited translation movement along the coupling axis. These degrees of freedom of movement make it possible to accompany the panel when it flexes and limit the stress concentration points. The attachment device according to this disclosure blocks the translation movement along the axis perpendicular the coupling axis, in the plane of the main faces of the panel: this prevents any damage to the edges of the panels by contact and/or rubbing between two adjacent panels.

According to an advantageous approach, the clip carries at least one attachment tongue formed by cropping and bending, fitted to the lug by claw effect. The hardness of the material constituting the clip is greater than that of the material constituting the lug, so as to ensure the holding of the panel by claw effect of the attachment tongue on the lug. By way of example, the lug is made from aluminium and the clip is made from steel.

According to another advantageous approach, the lug carries at least one fixing tongue formed by cropping and bending, fixed to the clip by claw effect. The hardness of the material constituting the lug is greater than that of the material constituting the clip, so as to ensure the holding of the panel by claw effect of the fixing tongue on the clip. By way of example, the clip is made from aluminium and the lug is made from steel.

According to yet another advantageous approach, each attachment device comprises at least one clamp positioned in the coupling space between the lug and the clip, the clamp carrying a plurality of attachment lugs formed by cropping and bending. The hardness of the material constituting the clamp is greater than that of the materials constituting the clip and the lug, so as to ensure the holding of the panel by claw effect of the attachment tongues on the clip and on the lug. By way of example, the clip and the lug are made from aluminium and the clamp is made from steel.

According to other advantageous features of this disclosure, taken alone or in combination:

the panel constitutes a photovoltaic module comprising a plurality of photovoltaic cells;

the peripheral part of the main faces of the panel is a so-called dead zone, having no photovoltaic cells;

the photovoltaic module is a frameless dual-glass photovoltaic module;

the photovoltaic module is a frameless dual-face photovoltaic module;

each attachment device comprises a support element secured to the clip in order to assemble the panel on a carrier structure.

This disclosure further relates to a panel assembly comprising:

a carrier structure having holding rails;

a plurality of panels resting on the rails by means of support elements;

attachment means for assembly the support elements on the rails.

BRIEF DESCRIPTION OF THE DRAWINGS

Other features and advantages of this disclosure will emerge from the detailed description of this disclosure that follows with reference to the accompanying figures, on which.

DETAILED DESCRIPTION

Figure 13:
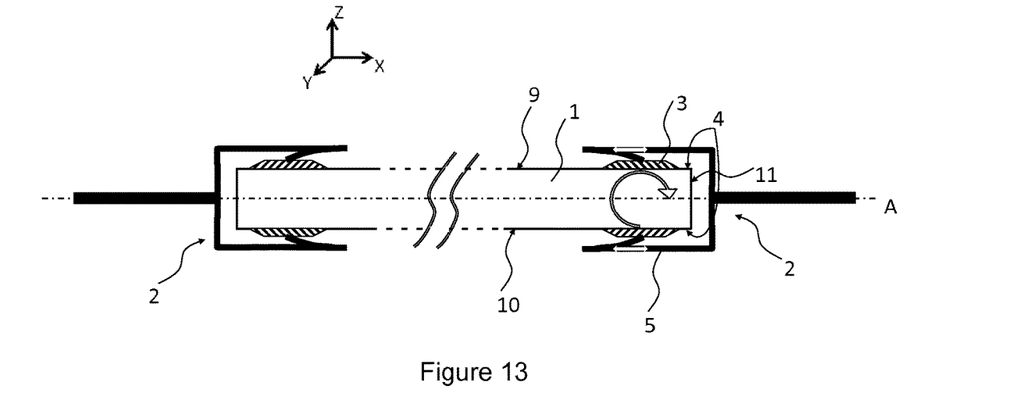
FIG. 13 presents a view in cross section of a panel provided with a plurality of attachment devices according to this disclosure.

This disclosure relates to a panel 1 liable to flex under the effect of a load having a peripheral surface 4 provided with a plurality of pivoting attachment devices 2, illustrated in FIG. 13.

The panel 1 consists of two main faces 9, 10 and an edge 11 over the entire periphery thereof, connecting the two main faces 9, 10. Peripheral surface 4 means a surface that extends over a peripheral part of each of the main faces 9, 10 and over the edge 11. Typically, the panel 1 is parallelepipedal in shape, with its width along the axis X (shown schematically in FIG. 13), its length along the axis Y and its thickness along the axis Z.

According to this disclosure, each attachment device comprises:
- a metal lug 3 bonded to the peripheral surface 4 of the panel 1;
- a metal clip 5 cooperating by fitting together with the lug 3 and configured so as to allow pivoting of the lug 3 when the panel 1 flexes.

The lug 3 and clip 5, both metal, are advantageously held with respect to each other by claw effect: that is to say an element able to be included in the lug 3, the clip 5 or a supplementary body, is clamped respectively on the clip 5, the lug 3 or both, according to various embodiments that will described in detail below. This contact by claw effect provides good mechanical holding between the lug 3 and the clip 5, while allowing pivoting of the lug 3 in the clip 5 when the panel 1 flexes.

Figure 1:
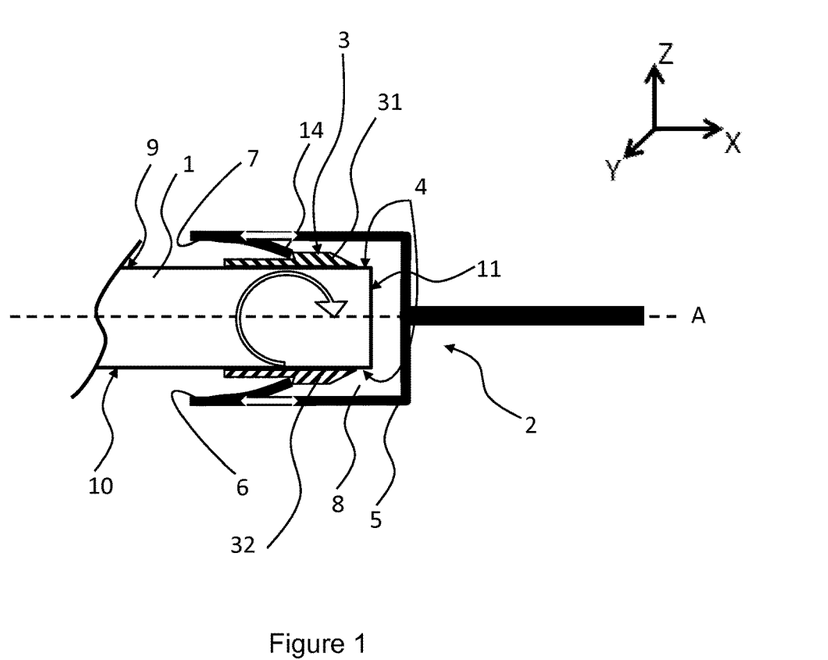
FIG. 1 presents a view in cross section of a panel provided with an attachment device, according to a first embodiment of this disclosure.

According to a first embodiment presented in FIG. 1, the lug 3 consists of two parts 31, 32, respectively bonded to a peripheral part of the two main faces 9, 10 of the panel 1. The lug 3 consists of a metal material and is bonded to the panel 1 by means of an adhesive substance affording strong adhesion between metal/glass or metal/polymer surfaces, chosen from silicone, epoxy or polyurethane glues.

By way of example, the dimensions of each of the parts 31, 32 of the lug 3 consist of:
- a length (along the axis Y shown schematically in FIG. 1) lying between 50 and 100 mm, advantageously equal to 80 mm;
- a width (along the axis X shown schematically in FIG. 1) by between 10 and 20 mm, advantageously equal to 15 mm;
- a thickness (along the axis Z shown schematically in FIG. 1) lying between 2 and 4 mm, advantageously equal to 3 mm.

Each part of the lug 3 comprises a shoulder of around 0.1 to 0.5 mm, shown schematically in FIG. 1, which will make it possible to lock the clip 5 after it is fitted on the lug 3.

The metal clip 5 comprises at least two walls 6, 7 defining a coupling space 8, making it possible to introduce the lug 3 into the clip 5 along a coupling axis A. The two walls 6, 7 of the clip 5 have a length (along the axis Y shown schematically in FIG. 1) of between 50 and 100 mm and a width (along the axis X shown schematically in FIG. 1) of between 10 and 20 mm. The thickness of the walls 6, 7 may vary between 1 and 3 mm.

The clip 5 further comprises flexible tongues 14, advantageously produced by cropping and bending a part of each of its two walls 6, 7. The tongues 14 are oriented toward the inside of the coupling space 8 and configured so that they are flexible and separate when the panel 1 provided with the lug 3 is introduced into the clip 5, along the coupling axis A; they therefore do not oppose any resistance to the fitting of the lug 3 in the clip 5. They are also configured so that they are rigid and lock on the shoulder of the lug 3, when the panel 1 is pulled in the direction of extraction from the coupling space 8. The panel 1 is thus firmly held in each attachment device because of the cooperation between the lug 3 (bonded on the peripheral surface of the panel 1) and the tongues 14 of the clip 5, which provides a non-return function. Furthermore, the mechanical connection between the tongues 14 and two parts 31, 32 of the lug 3 act on the lug/panel bonding interface essentially in shearing: the glues chosen to fix the lug 3 on the peripheral surface 4 of the panel 1 offers precisely a very strong resistance to this type of force.

According to this first embodiment of this disclosure, the clip 5 grips the two parts 31, 32 of the lug 3 and a peripheral part of the panel 1. The panel 1 nevertheless has degrees of freedom of movement: in pivoting firstly, as shown schematically by the arrow in an arc of a circle on FIG. 1. This movement makes it possible to accompany the flexing of the panel 1 and avoids creating a stress concentration point by planar contact of the panel 1 on the walls 6, 7 of the clip 5. Pivoting is possible because of a sufficient free space, provided in the coupling space 8, and the flexible character of the tongues 14. This free space prevents any contact between the lug 3 or the panel 1 and the clip 5, other than the holding contact provided by the tongues 14 on the lug 3. The spacing between each wall 6, 7 of the clip 5 and the part 31, 32 of the facing lug 3 is around 2 to 3 mm.

Moreover, the panel 1 has a degree of freedom of movement in translation, along the coupling axis A, as illustrated by the two white arrows in FIG. 1. The amplitude of this translation movement is nevertheless limited: it is blocked in the direction of extraction of the panel 1 by the shoulder (shown in FIG. 1) present on each part 31, 32 of the lug 3; it is free over a few millimeters (1 to 3 mm) in the direction of introduction of the panel 1.

The degrees of freedom of movement in pivoting and translation along the coupling axis A increase the resistance of the panel 1 to the forces resulting from a high weight load. The mechanical connection between the two parts 31, 32 of the metal lug 3 and metal tongues 14 of the clip 5 is particularly strong and prevents any unintentional damage over time to the attachment or extraction device of the panel 1.

Figure 2:
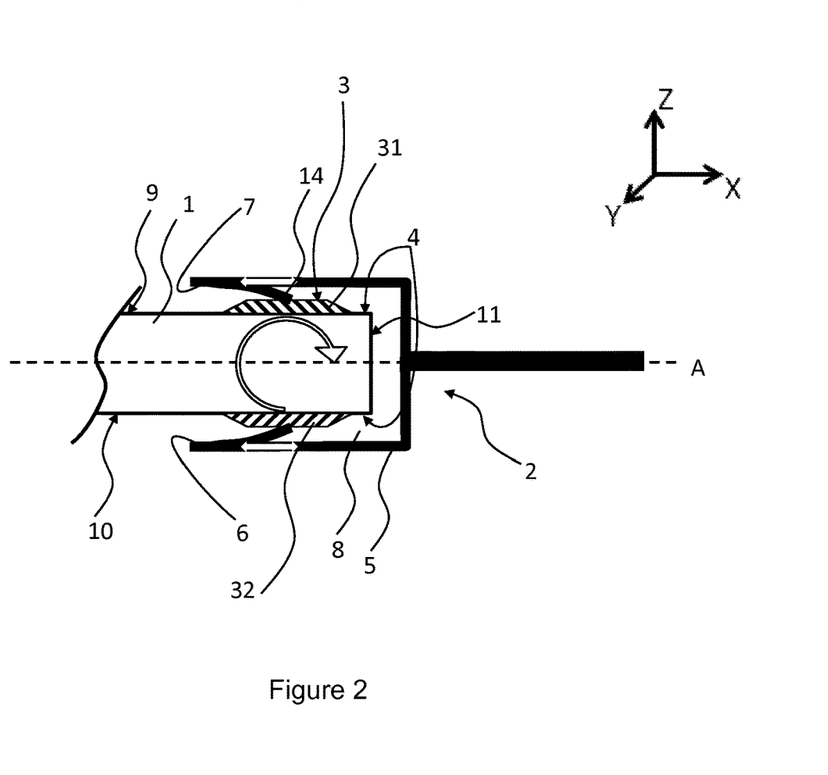
FIG. 2 presents a view in cross section of a panel provided with an attachment device, according to a second embodiment of this disclosure.

FIG. 2 presents a second embodiment according to this disclosure. The lug 3 consists of two parts 31, 32 bonded respectively to a peripheral part of the two main faces 9, 10 of the panel 1. The lug 3 consists of a metal material and is bonded to the panel 1 by means of an adhesive substance. Each part 31, 32 of the lug 3 has dimensions in the same ranges as those described previously in the first embodiment.

The metal clip 5 comprises at least two walls 6, 7 defining a coupling space 8, making it possible to introduce the peripheral part of the panel 1, provided with the lug 3, in the clip 5 along the coupling axis A. It further comprises flexible tongues 14, advantageously produced by cropping and bending a part of each of its two walls 6, 7. The tongues 14 are oriented toward the inside of the coupling space 8 and configured so that they are flexible and separate when the panel 1 provided with lugs 3 is introduced into the clip 5, along the coupling axis A. They are also configured so that they are rigid and fit in the parts 31, 32 of the lug 3 by claw effect, when the panel 1 is pulled in the direction of extraction from the coupling space 8. The hardness of material constituting the clip 5 (and therefore the tongues 14) is greater than that of the material constituting the lug 3, so as to allow the entry and clamping of the tongues 14 in the lug 3. By way of example, the lug 3 is made from aluminium and the clip 5 is made from steel.

The panel 1 is thus firmly held in each attachment device because of the cooperation between the two parts 31, 32 of the lug 3 (bonded in the peripheral surface of the panel 1) and the tongues 14 of the clip 5, which provides a non-return function. Furthermore, the mechanical connection between the tongues and the lugs acts on the lug/panel bonding interface essentially in shearing: the glues chosen to fix each lug 3 on the peripheral surface 4 of the panel 1 offer precisely a very high resistance to this type of stress.

According to this second embodiment of this disclosure, the clip 5 encloses the two parts 31, 32 of the lug 3 and a peripheral part of the panel 1. The panel 1 nevertheless has degrees of freedom of movement: in pivoting firstly, as shown schematically by the arrow in an arc of a circle in FIG. 2. This movement makes it possible to accompany the flexing of the panel 1 and avoids creating a stress concentration point by flat contact of the panel 1 on the walls 6, 7 of the clip 5. Pivoting is possible because of a sufficient free space, provided in the coupling space 8, and the flexible character of the tongues 14. The spacing between each wall 6, 7 of the clip 5 and the part 31, 32 of the lug 3 facing is around 2 to 3 mm.

Moreover, the panel 1 has a degree of freedom of movement in translation, along the coupling axis A, as illustrated by the two white arrows in FIG. 2. The amplitude of this translation movement is nevertheless limited. This is because it is blocked in the direction of extraction of the panel 1 by a protrusion (not shown in FIG. 2) formed on each part 31, 32 of the lug 3 by the claw effect of the tongues 14: the material constituting the tongues 14, which is harder, clamps the material constituting the parts 31, 32 of the lugs 3, and forms at the end of the clamping, a protrusion on the parts 31, 32; this protrusion acts as a shoulder or a stop and blocks the translation movement, in the direction of extraction of the panel 1. The height of the protrusion is around 0.1 mm. Moreover, the panel 1 keeps a freedom of movement in translation, over a few millimeters (1 to 3 mm), in the direction of introduction of the panel 1.

The degrees of freedom of movement in pivoting and in translation along the coupling axis A increase the resistance of the panel 1 to the forces resulting from a high weight load. The mechanical connection between the parts 31, 32 of the metal lug 3 and the metal tongues 14 of the clip 5 is particularly strong. The protrusion formed in the metal material of the lug by plastic deformation constitutes a shoulder lasting over time providing the locking of the tongues 14 on the lug 3 and thereby the holding of the panel 1 in each attachment device.

Figure 3:
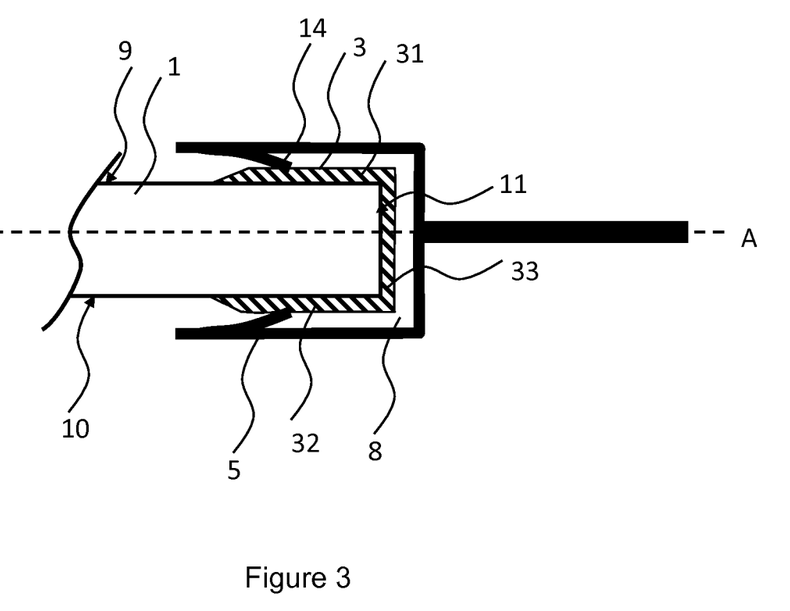
FIGS. 3 and 4 present views in cross section of a panel provided with an attachment device according to variants of the first and second embodiments of this disclosure.

According to a variant of the second embodiment, presented in FIG. 3, the attachment device comprises a lug 3 consisting of three parts: a first part 31, bonded onto the peripheral part of the first main face 9 of the panel 1, a second part 32, bonded onto the peripheral part of the second main face 10 of the panel 1, and a third part 33, bonded onto the edge 11 of the panel 1. In this case, the lug 3 forms a U-shaped bracket bonded onto the peripheral surface of the panel 1. The first 31 and second 32 parts of the lug 3 are intended to cooperate with the tongues 14 of the clip 5, to provide attachment of the panel 1. The part 33 of the lug 3 for its part provides protection of the edge 11 and of the corners between the main faces 9, 10 and the edge 11 of the panel: it prevents potential contact between the material (for example, glass) of the panel 1 and the metal clip 5 in the coupling space 8 and associated damage.

Figure 4:
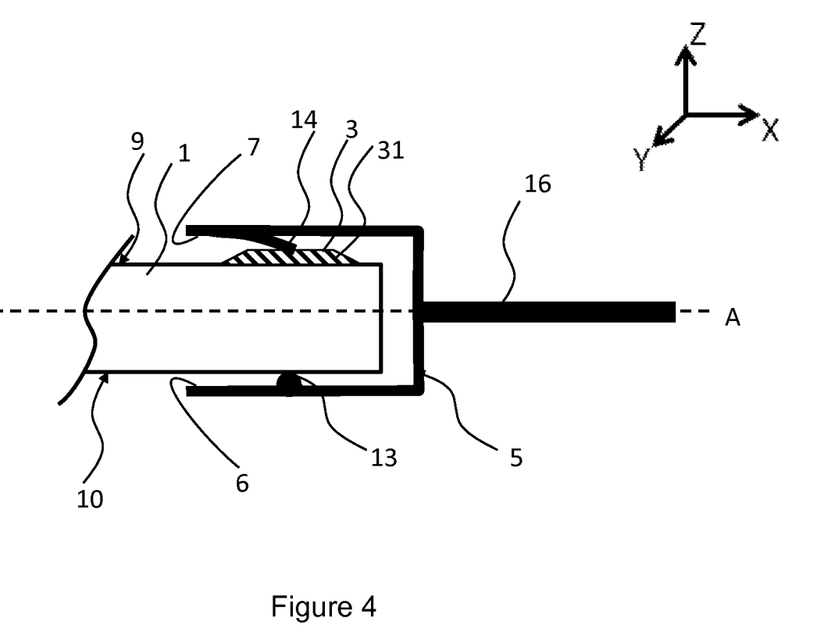

According to another variant of the second embodiment, the attachment device comprises a lug 3, formed by a part 31 bonded on the peripheral part of one of the main faces, for example, the first main face 9, as illustrated in FIG. 4. The lug 3 is intended to cooperate with at least one tongue 14, produced by cropping and bending a part of the wall 7 of the clip 5, in order to provide the attachment of the panel 1.

Advantageously, the tongue 14 extends over the length of the wall 7, thus forming a linear mechanical connection (along the axis Y shown schematically in FIG. 4) with the lug 3. By way of example, the lug has a length of 60 mm, the clip (and therefore the wall 7) has a length of 60 mm and the tongue extends over a length of 40 mm; it thus clamps the lug on a linear zone of 40 mm and creates a protrusion substantially of this length. The height (along the axis Z) of the protrusion is around 0.1 mm.

The wall 6 of the clip 5 for its part is provided with a linear support body 13 along the axis Y shown schematically in FIG. 4, helping to allow the pivoting of the lug 3 when the panel 1 flexes. The support body 13 has, for example, the shape of a semicylinder with a length of 40 mm and provides a space between the panel 1 and the wall 6 of the clip 5 of around 2 to 3 mm. In FIG. 4, the support body 13 is formed on the wall 6 of the clip 5 and is in direct contact with the panel. According to a variant that is not shown, the panel 1 may comprise a second lug part 3 on the peripheral part of its second main face 10; the support body 13 is then in contact with the lug 3. According to another variant that is not shown, the support body 13, in the form of a semicylinder, may be bonded on the peripheral part of the second main face 10 of the panel 1; the support body 13 is then in contact with the wall 6 of the clip 5.

The variants described are of course not limited to the second embodiment; they may be combined with each other and/or be applied to the various embodiments according to this disclosure.

Figure 5:
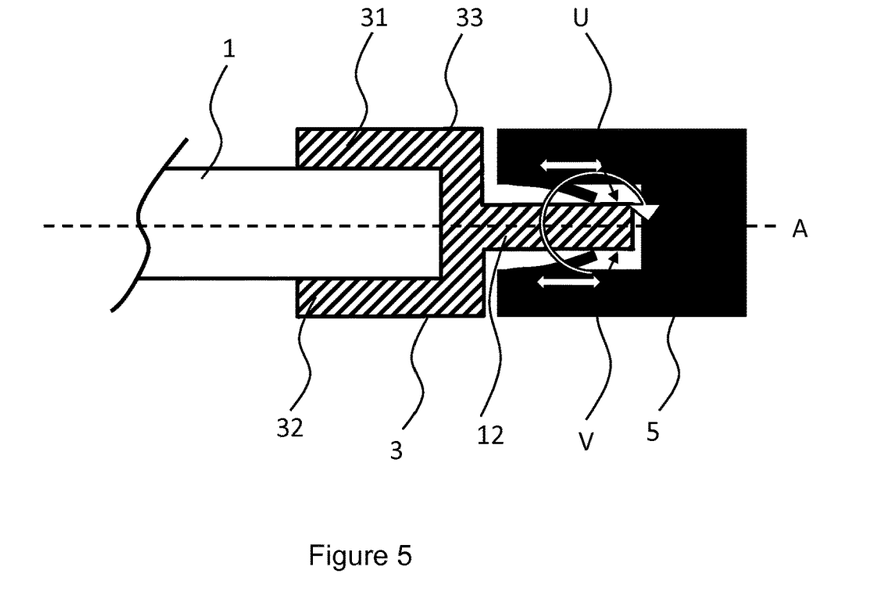
FIG. 5 presents a view in cross section of a panel provided with an attachment device, according to a third embodiment of this disclosure.

FIG. 5 presents a third embodiment according to this disclosure. The lug 3, bonded on the peripheral surface of the panel 1, comprises three parts 31, 32, 33 forming a U-shaped bracket. It further comprises an offset part 12 having two opposite free faces U, V to which the clip 5 is attached. The attachment is done by means of tongues clamped on these two faces or locked by shoulders present on these two faces. In this case, the clip 5 grips only the offset part 12 of the lug 3, and not the peripheral part of the panel 1. The offset part 12 of the lug 3 has degrees of freedom of movement in pivoting and translation (limited) as shown by the white arrows in FIG. 5. This makes it possible to accompany the movement of the panel 1 during flexing under weight load.

Figure 6:
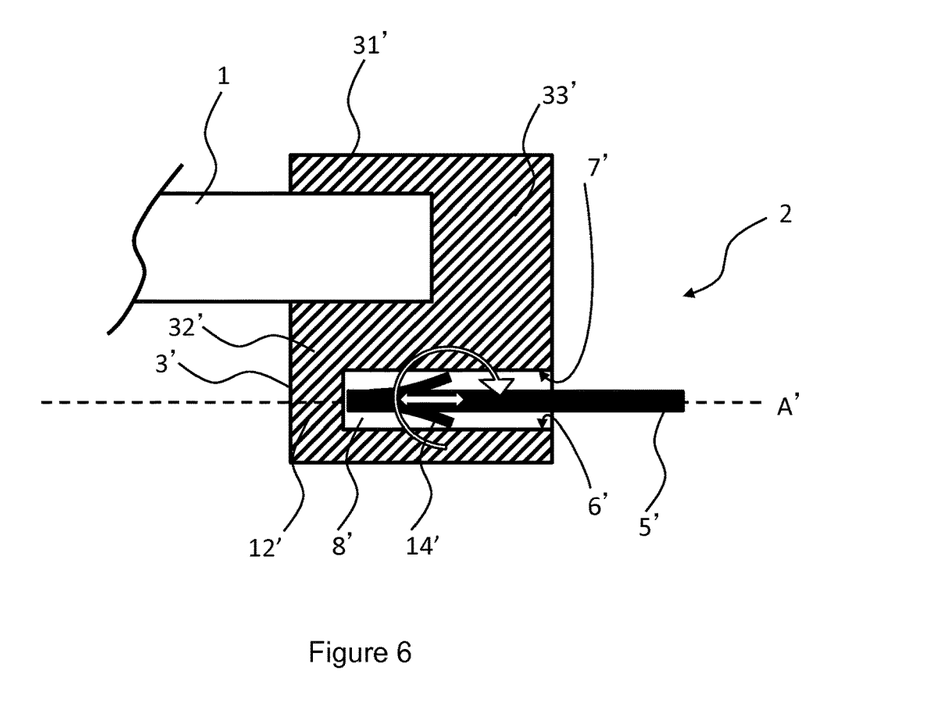
FIG. 6 presents a view in cross section of a panel provided with an attachment device, according to a fourth embodiment of this disclosure.

FIG. 6 presents a fourth embodiment according to this disclosure. The lug 3', bonded on the peripheral surface of the panel 1, comprises three parts 31', 32', 33' forming a U-shaped bracket, and an offset part 12'. This time, the offset part 12' comprises two facing walls 6', 7' defining a coupling space 8' making it possible to introduce the clip 5' along a coupling axis A'.

The clip 5' comprises flexible tongues 14', advantageously produced by cropping and bending a part of the clip 5'. The tongues 14' are configured so that they are flexible and grip each other when the clip 5' is introduced into the coupling space 8' of the offset part 12' of the lug 3', along the coupling A; they therefore do not oppose any resistance to the fitting together of the clip 5' and lug 3'. They are also configured so that they are rigid and clamp in the walls 6', 7' of the offset part 12' of the lug 3', in the direction of extraction of the clip 5' from the coupling space 8'. The hardness of the material constituting the clip 5' (and therefore the tongues 14') is greater than that of the material constituting the lug 3', so as to allow penetration and clamping of the tongues 14' in the lug 3'. By way of example, the lug 3 is made from aluminium and the clip 5 is made from steel.

Alternatively, the walls 6', 7' of the offset part 12' of the lug 3' comprise a shoulder making it possible to lock the tongues in the direction of extraction of the clip 5' from the coupling space 8'. According to this variant, the lug 3' and the clip 5' may consist of the same material.

The panel 1 is thus firmly held in each attachment device because of the cooperation between each lug 3' and the tongues 14' of each clip 5'. They do nevertheless keep degrees of freedom of movement in pivoting and translation (limited), as explained previously, because of the flexible character of the tongues 14' and the free space provided in the coupling space 8', between the walls 6', 7' of the offset part 12' of the lug 3' and the clip 5'.

Figure 7:
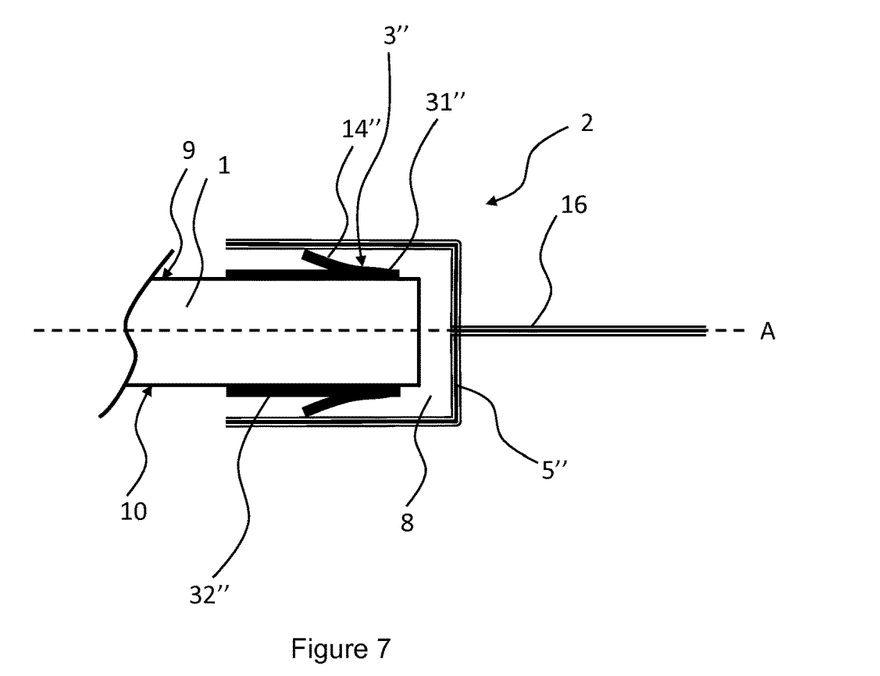
FIG. 7 presents a view in cross section of a panel provided with an attachment device, according to a fifth embodiment of this disclosure.

According to a fifth embodiment of this disclosure, shown in FIG. 7, the lug 3" consists of two parts 31", 32", bonded on the peripheral part respectively of the two main faces 9, 10 of the panel 1. Each part 31", 32" of the lug 3" comprises at least one flexible tongue 14", configured so that it tightens when the panel 1 provided with the lug 3" is introduced into the clip 5", along the coupling axis A; the tongue 14" thus does not oppose any resistance to the fitting of the lug 3" in the clip 5". It is also configured so that it is rigid and clamps in the internal wall of the clip 5", when the panel 1 is pulled in the direction of its extraction from the coupling space 8. The hardness of the material constituting the lug 3" (and therefore the tongues 14") is greater than that of the material constituting the clip 5", so as to allow penetration and clamping of the tongues 14" in the internal walls of the clip 5". By way of example, the lug 3" is made from steel and the clip 5" is made from aluminium.

The panel 1 is thus firmly held in each attachment device 2 because of the cooperation between the tongues 14" of the parts 31", 32" of the lug 3" and the internal walls of the clip 5". Furthermore, the mechanical connection between the tongues 14" and the clip 5" acts on the lug/panel bonding interface essentially in shearing: the glues chosen for fixing each lug 3" on the peripheral face of the panel 1 offer precisely very high resistance to this type of stress.

Figure 8:
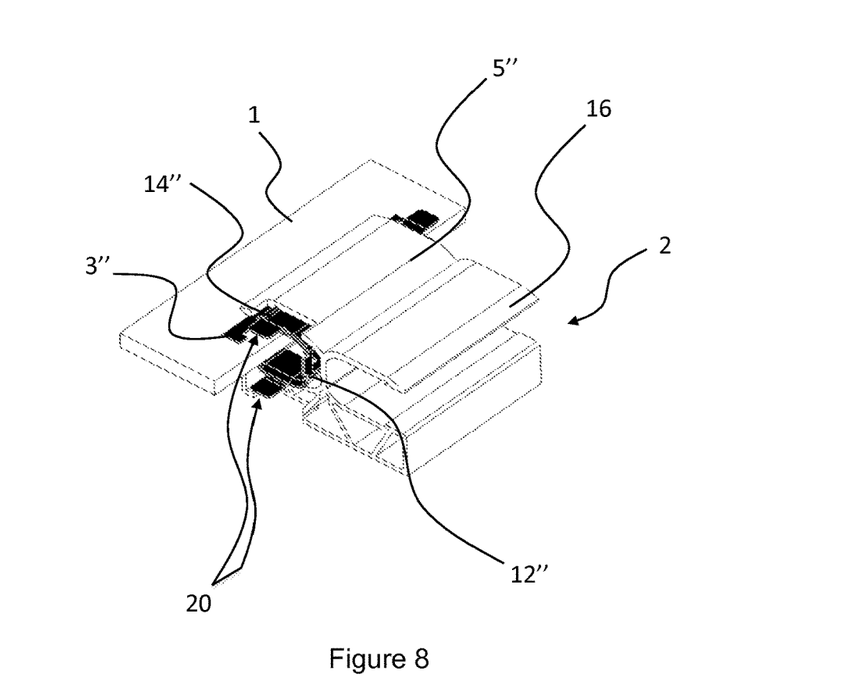
FIG. 8 presents a perspective view of a panel provided with an attachment device according to a variant of the fifth embodiment of this disclosure.

FIG. 8 presents a variant of the fifth embodiment according to this disclosure. The lug 3" comprises two parts bonded on the peripheral part of the two main faces of the panel 1. It also comprises an offset part 12" in a U shape, which carries the tongues 14" intended to cooperate with the clip 5". The clip 5" has a U shape, defining a coupling space intended to receive the offset part 12" of the lug 3". The internal walls of the clip 5", facing the tongues 14", comprises shoulders making it possible to lock the tongues 14" after introduction of the lug 3" in the coupling space of the clip 5": this connection provides the non-return function (in the direction of extraction of the panel 1) from the fixing device 2.

In order to facilitate the removal of the attachment device 2, for example, in order to change the panel 1, the offset part 12" of the lug 3" also comprises two fins 20 secured to the tongues 14", at each of its ends in the direction of the length. The bringing together of two facing fins 20 makes it possible to flex the tongues 14" so as to make them pass the shoulder of the clip 5" and to release them. This bringing together of the fins in pairs takes place by applying a clamping force on the two fins. This configuration therefore makes it possible to disconnect the lug 3 (and therefore the panel 1) from the clip 5", without the use of specific tools, offering a robust, simple and effective attachment solution.

Figure 9:
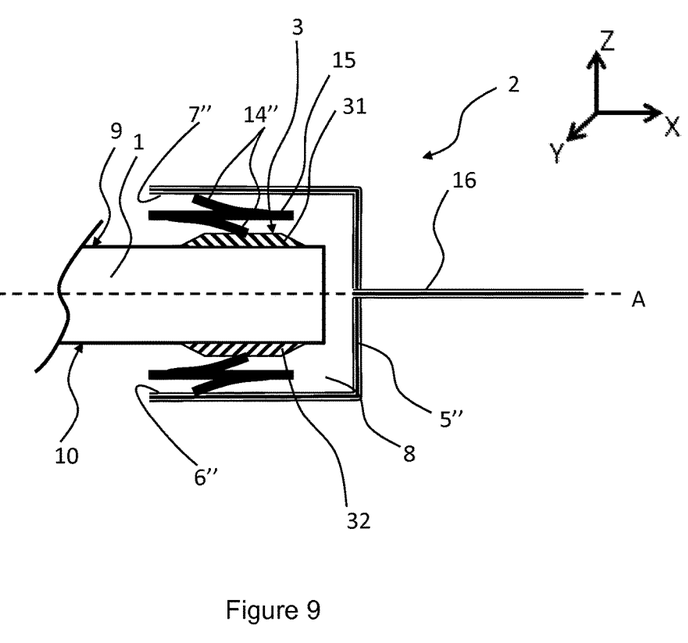
FIG. 9 presents a view in cross section of a panel provided with an attachment device, according to a sixth embodiment of this disclosure.

FIG. 9 presents a sixth embodiment of this disclosure. The lug 3 consists of two parts 31, 32, bonded on a peripheral part respectively of the two main faces 9, 10 of the panel 1. The lug 3 consists of a metal material and is bonded on the panel 1 by means of an adhesive substance affording strong adhesion between metal/glass or metal/polymer surfaces, chosen from silicone, epoxy, polyurethane, glues, etc.

By way of example, the dimensions of the two parts 31, 32 of the lug 3 consist of:
- a length (along the axis Y shown schematically in FIG. 9) of between 50 and 100 mm, advantageously equal to 80 mm;
- a width (along the axis X shown schematically in FIG. 9) of between 10 and 20 mm, advantageously equal to 15 mm;
- a thickness (along the axis Z shown schematically in FIG. 9) of between 2 and 4 mm, advantageously equal to 3 mm.

The metal clip 5" comprises at least two walls 6", 7" defining a coupling space 8, making it possible to introduce the parts 31, 32 of the lug 3 in the clip 5" along a coupling axis A. The two walls 6", 7" of the clip 5" have dimensions in length (along the axis Y shown schematically in FIG. 9) of between 50 and 100 mm and in width (along the axis X shown schematically in FIG. 9) of between 10 and 20 mm. The thickness of the walls 6", 7" may vary between 1 and 3 mm.

The attachment device 3 further comprises a metal clamp 15; it comprises flexible tongues 14", advantageously produced by cropping and bending a part of the clamp 15. The tongues 14" are intended to be clamped firstly on each of the parts 31, 32 of the lug 3 and secondly on the internal walls 6", 7" of the clip 5". The hardness of the material constituting the clamp 15 (and therefore the tongues 14") is greater than that of the material constituting the lug 3 and the clip 5", so as to allow penetration and clamping of the tongues 14" in the parts 31, 32 of the lug 3. By way of example, the lug 3 and the clip 5" are made from aluminum and the clamp 15 is made from steel.

In this sixth embodiment, the clip 5" grips the clamp 15, the two parts 31, 32 of the lug 3 and a peripheral part of the panel 1. The panel 1 is thus firmly held in each attachment device because of the cooperation between firstly the parts 31, 32 of the lug 3 (bonded on the peripheral surface of the panel 1) and the tongues 14" of the clamp 15, and secondly the walls 6", 7" of the clip 5" and the tongues 14" of the clamp 15.

The panel 1 nevertheless has degrees of freedom of movement: in pivoting firstly, this movement making it possible to accompany the flexing of the panel 1 and avoids creating a stress concentration point by flat contact of the panel 1 on the walls 6", 7" of the clip 5". Pivoting is possible because of a sufficient free space, provided in the coupling space 8, and the flexible character of the tongues 14". This free space prevents any contact between the lug 3 or the panel 1 and the clip 5", apart from the holding contact provided by the tongues 14". The spacing between each wall 6", 7" of the clip 5" and the clamp 15 is around 2 mm; the spacing between the clamp 15 and each part 31, 32 of the facing lug 3 is also around 2 mm.

Moreover, the panel 1 has a degree of freedom of movement in translation, along the coupling axis A. The amplitude of this translation movement is nevertheless limited. This is because it is blocked in the direction of extraction of the panel 1 by a protrusion (not shown in FIG. 9) formed on each part 31, 32 of the lug 3 by the claw effect of the tongues 14": the material constituting the tongues 14", which is harder, grips the material constituting the lug 3, and forms at the end of the gripping a protrusion on the parts 31, 32 of the lug 3; this protrusion acts as a shoulder and blocks the translation movement, in the direction of extraction of the panel 1. In the same way, a protrusion (not shown in FIG. 9)

is formed on the internal walls 6", 7" of the clip 5", because of the gripping of the tongues 14" cooperating with the walls 6", 7". The height of the protrusions is around 0.1 mm. Moreover, the panel 1 keeps a freedom of movement in translation, over a few millimeters (1 to 3 mm) in the direction of the introduction of the panel 1 into the coupling space.

Figure 10:
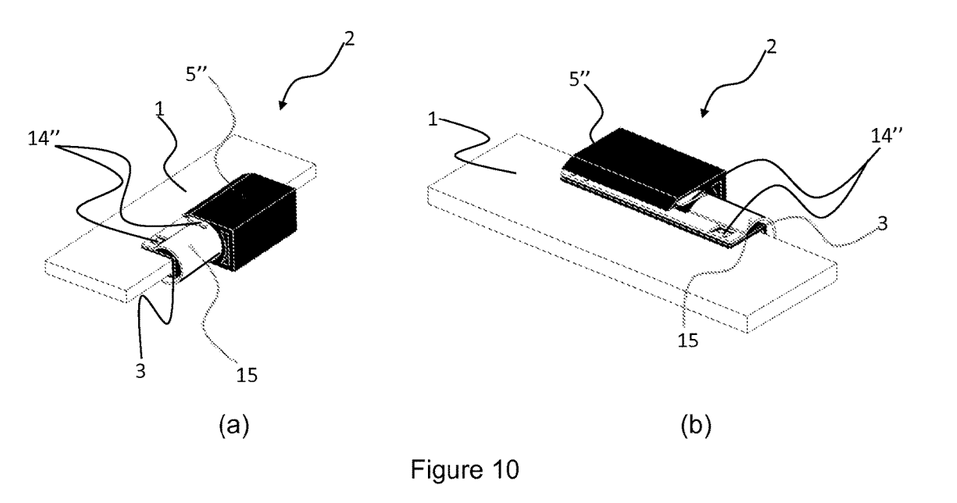
FIG. 10 presents a perspective view of a panel provided with an attachment according to a variant of the sixth embodiment of this disclosure.

FIGS. 10a and 10b present two perspective views of a variant of the sixth embodiment according to this disclosure. The lug 3 is bonded on the peripheral part of the panel 1 and forms a U-shaped bracket. The clamp 15 is gripped on the lug 3 by means of tongues 14", at each end of the clamp 15 in the direction of the length (only one tongue 14", cooperating with the lug 3, is visible in FIGS. 10a and 10b because of the presence of the clip 5", which masks the other tongue 14" at the other end). The lug 3 and the clamp 15 have substantially the same length. The clip 5" has a shorter length and grips the clamp 15, the lug 3 and the peripheral part of the panel 1. It is attached by means of a tongue 14" of the clamp 15, coming to be locked on a shoulder provided on the internal walls of the clip 5", visible in FIGS. 10a and 10b. The attachment device 2 fulfills a non-return function (in the direction of the extraction of the panel 1) and a high level of mechanical strength.

The panel 1, having a peripheral surface 4 provided with pivoting attachment devices 2 according to this disclosure, may in particular constitute a photovoltaic module comprising a plurality of photovoltaic cells.

Advantageously, the panel 1 is a frameless dual-panel photovoltaic module. The panel 1 may also be a frameless dual-face photovoltaic module, that is to say comprising a plurality of photovoltaic cells on each of its two main faces. This attachment 2 occupies a peripheral surface of the panel 1 lying in a so-called dead zone, that is to say with no photovoltaic cells. This dead zone typically has a width of 15 mm. The plurality of attachment devices 2 with which the panel 1 is provided thus does not create any shadow liable to affect the performance of the photovoltaic cells.

Figure 11:
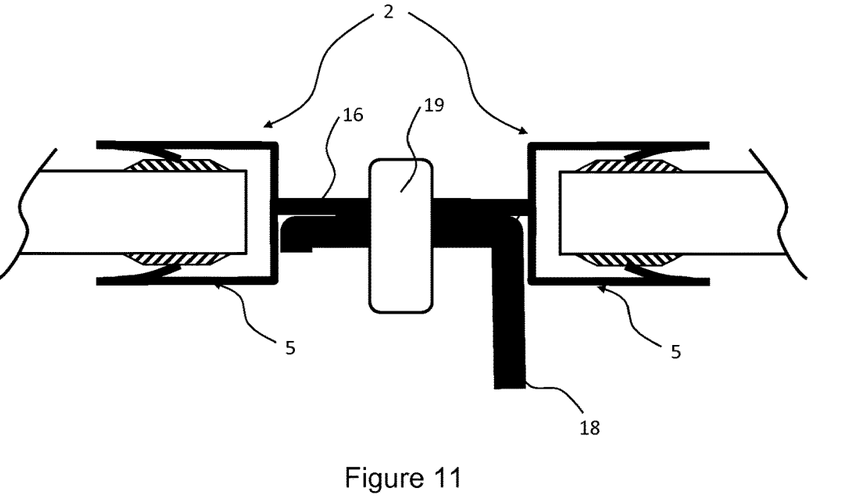
FIG. 11 presents a view in cross section of a set of panels according to this disclosure.

As shown in FIG. 11, such a module must be assembled on rails 18 of a carrier structure. Each attachment device 2 comprises a support element 16 secured to the clip 5. The support element 16 is intended to be secured to the rail 18, by means of an attachment means 19. This attachment means 19 may for example, be an attachment clip.

Figure 12:
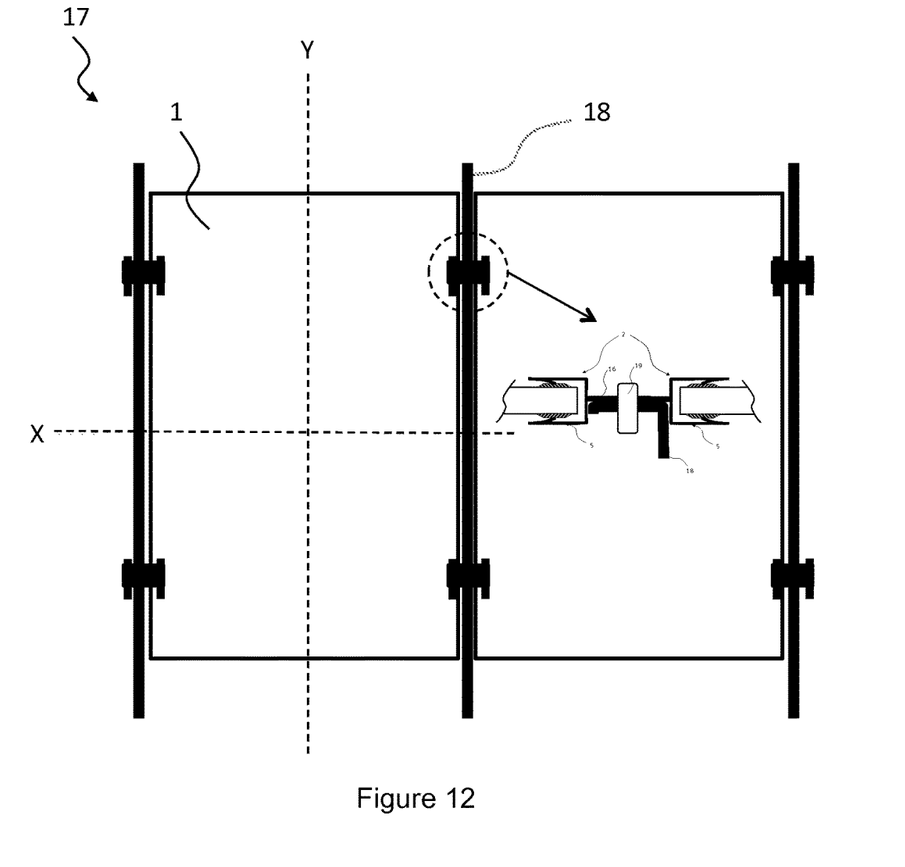
FIG. 12 presents a plan view of an assembly of panels, according to this disclosure.

FIG. 12 shows an assembly 17 of two panels 1, each panel 1 being provided with four attachment devices disposed on peripheral parts of its large sides (along the axis Y shown schematically in the figure). Advantageously, the attachment devices are disposed at locations corresponding approximately to one quarter and three quarters of the length of the panel 1 (along the axis Y). Such a configuration assists the flatness of the panel 1 along the axis Y, under a uniform weight load.

The attachment devices described previously in the various embodiments of this disclosure allow degrees of freedom of movement of the panel 1, in particular in pivoting. Thus, under a weight load, the flexing of the panel 1 along the axis X shown schematically in FIG. 12 does not generate any stress concentration point since there is no flat contact between the flexing panel 1 and the clip 5 attached to the rail 18. Moreover, the flexibility of the lug/clip connection also allows a slight pivoting of the panel 1 in the clip when there is any flexing along the axis Y.

It is nevertheless important for the translation movement of each panel 1 along the axis Y (that is to say in a direction perpendicular to the coupling axis and parallel to the main faces of the panel 1) to be blocked. This is because, in the particular case of frameless photovoltaic modules, contact and rubbing between the edges of two adjacent panels would damage them. The attachment devices according to this disclosure meet this specification by integrating this locking with respect to translation, therefore not requiring the addition of an external stop element.

In the case of an attachment device based on attachment of a tongue by claw effect (the material constituting the tongue being harder than the material constituting the element gripped, lug or clip), a protrusion forms to block the tongue, in the direction of extraction of the panel 1 (along the coupling axis). A protrusion also forms at each corner of the tongues: it constitutes the stop that blocks the translation movement of the panel 1 along the axis Y shown schematically in FIG. 12.

In the case of attachment by locking a tongue on a shoulder (as described in the first embodiment), a shoulder blocking the translation movement along the axis Y of the tongue is added to the element cooperating therewith (lug and/or clip).

Naturally this disclosure is not limited to the embodiments described and variant embodiments can be added thereto without departing from the scope of this disclosure as defined by the claims.

The invention claimed is:

1. An apparatus, comprising:
a panel able to flex under the effect of a load and having a peripheral surface; and
a plurality of pivoting attachment devices, each attachment device comprising:
a metal lug bonded to the peripheral surface of the panel; and
a metal clip coupled with the metal lug along a coupling axis (A) parallel to the peripheral surface of the panel, and cooperating with the metal lug so as to allow pivoting movement between the metal lug and the metal clip when the panel flexes; and
at least one flexible attachment tongue located in a free space defined between the metal lug and the metal clip;
wherein the attachment tongue allows holding the metal lug and the metal clip with respect to each other; and
wherein the free space allows the pivoting between the metal lug and the metal clip when the panel flexes.

2. The apparatus of claim 1, wherein the metal clip comprises two facing walls defining a coupling space configured to receive the metal lug therein along the coupling axis (A).

3. The apparatus of claim 2, wherein each pivoting attachment device comprises at least one clamp positioned in the coupling space between the metal lug and the metal clip, the clamp including a plurality of attachment tongues clamping on the metal clip and on the metal lug, the plurality of attachment tongues including the at least one flexible attachment tongue.

4. The apparatus of claim 3, wherein a hardness of a material of the at least one clamp is greater than a hardness of a material of the metal clip and a hardness of a material of the metal lug.

5. The apparatus of claim 1, wherein the metal lug comprises two facing walls (defining a coupling space configured to receive the metal clip therein along the coupling axis (A).

6. The apparatus of claim 1, wherein each pivoting attachment device is configured so as to allow a limited translational movement of the metal lug (along the coupling axis (A) when the panel flexes.

7. The apparatus of claim 1, wherein the panel has two main faces and an edge connecting the two main faces, and wherein the peripheral surface extends over a peripheral part of each of the main faces and over the edge.

8. The apparatus of claim 1, wherein each pivoting attachment device further comprises a stop blocking translational movement of the metal lug in a direction perpendicular to the coupling axis and parallel to the main faces of the panel.

9. The apparatus of claim 8, wherein the metal lug comprises a first part bonded to one of the main faces.

10. The apparatus of claim 9, wherein the metal lug comprises a second part bonded to the other one of the main faces.

11. The apparatus of claim 10, wherein the metal lug comprises a third part bonded to the edge, the first part, the second part and the third part together defining a U-shaped bracket.

12. The apparatus of claim 1, wherein the metal lug comprises an offset part having two opposite free faces to which the metal clip is attached.

13. The apparatus of claim 1, wherein each pivoting attachment device comprises a linear support body facilitating the pivoting movement between the metal lug and the metal clip when the panel flexes.

14. The apparatus of claim 1, wherein the at least one flexible attachment tongue is part of the metal clip.

15. The apparatus of claim 14, wherein a hardness of a material of the metal clip is greater than a hardness of a material of the metal lug.

16. The apparatus of claim 1, wherein the at least one flexible attachment tongue is part of the metal lug.

17. The apparatus of claim 16, wherein a hardness of a material of the metal lug is greater than a hardness of a material of the metal clip.

18. The apparatus of claim 1, wherein the apparatus is a photovoltaic module comprising a plurality of photovoltaic cells.

19. The apparatus of claim 18, wherein the peripheral surface of the panel is a dead zone with no photovoltaic cells.

20. The apparatus of claim 18, wherein the photovoltaic module is a frameless dual-glass photovoltaic module.

21. The apparatus of claim 20, wherein the photovoltaic module is a frameless dual-face photovoltaic module.

22. The apparatus of claim 1, wherein each pivoting attachment device comprises a support element secured to the metal clip for assembling the panel on a carrier structure.

23. A panel assembly, comprising:
a carrier structure having holding rails;
a plurality of panels each being able to flex under the effect of a load and having a peripheral surface;
a plurality of pivoting attachment devices, each pivoting attachment device comprising:
a metal lug bonded to the peripheral surface of a panel of the plurality of panels;
a metal clip coupled with the metal lug along a coupling axis (A) parallel to the peripheral surface of a panel of the plurality of panels, and cooperating with the metal lug so as to allow pivoting movement between the metal lug and the metal clip when the panel of the plurality of panels flexes;
at least one flexible attachment tongue located in a free space defined between the metal lug and the metal clip, wherein the attachment tongue allows holding the metal lug and the metal clip with respect to each other, and wherein the free space allows the pivoting between the metal lug and the metal clip when the panel of the plurality of panels flexes; and
a support element secured to the metal clip; and
attachment members securing the support elements plurality of pivoting attachment devices to the holding rails of the carrier structure.

* * * * *